US008314856B2

(12) United States Patent
Kuriyama

(10) Patent No.: US 8,314,856 B2
(45) Date of Patent: Nov. 20, 2012

(54) IMAGING APPARATUS, VARIABLE SPEED IMAGING METHOD, AND RECORDING MEDIUM STORING PROGRAM THEREOF

(75) Inventor: Yuji Kuriyama, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 451 days.

(21) Appl. No.: 12/570,200

(22) Filed: Sep. 30, 2009

(65) Prior Publication Data

US 2010/0079620 A1    Apr. 1, 2010

(30) Foreign Application Priority Data

Sep. 30, 2008  (JP) ................................. 2008-253745

(51) Int. Cl.
*H04N 5/76* (2006.01)
*H04N 5/77* (2006.01)
(52) U.S. Cl. ...................... 348/231.3; 386/228; 386/229
(58) Field of Classification Search ........................ None
See application file for complete search history.

(56) References Cited

U.S. PATENT DOCUMENTS

| 7,920,775 | B2 | 4/2011 | Tagawa |
| 2003/0146981 | A1* | 8/2003 | Bean et al. .................. 348/222.1 |
| 2003/0189647 | A1* | 10/2003 | Kang .......................... 348/207.99 |
| 2004/0036807 | A1* | 2/2004 | Takahashi et al. ................ 348/700 |
| 2006/0114334 | A1* | 6/2006 | Watanabe et al. ............ 348/222.1 |
| 2007/0217765 | A1* | 9/2007 | Itoh et al. .......................... 386/117 |
| 2008/0079817 | A1 | 4/2008 | Murata et al. |
| 2008/0180569 | A1* | 7/2008 | Imaida .............................. 348/441 |
| 2009/0102938 | A1* | 4/2009 | Takahashi et al. ........... 348/222.1 |
| 2009/0195675 | A1* | 8/2009 | Haneda ...................... 348/240.99 |
| 2010/0060752 | A1* | 3/2010 | Tokuyama .................... 348/240.3 |
| 2010/0092151 | A1* | 4/2010 | Miyakoshi ........................ 386/68 |
| 2010/0214422 | A1* | 8/2010 | Iwamura et al. ............. 348/208.4 |
| 2011/0142412 | A1* | 6/2011 | Tagawa .......................... 386/230 |

FOREIGN PATENT DOCUMENTS

| JP | 2002-320198 A | 10/2002 |
| JP | 2006-352581 A | 12/2006 |
| WO | WO 2008/038831 A1 | 4/2008 |

OTHER PUBLICATIONS

EESR dated Apr. 23, 2010 in counterpart European Application No. 09170377.7.
Japanese Office Action dated Dec. 16, 2011 (and English translation thereof) in counterpart Japanese Application No. 2008-253745.

\* cited by examiner

*Primary Examiner* — Lin Ye
*Assistant Examiner* — John H Morehead, III
(74) *Attorney, Agent, or Firm* — Holtz, Holtz, Goodman & Chick, PC

(57) ABSTRACT

In an imaging apparatus, a continuous shooting speed change controlling section (3) generates an instruction to change a continuous shooting speed (in other words, a recording frame rate) to, for example, 30 fps, 150 fps, or 300 fps. When the continuous shooting speed is changed by the continuous shooting speed change controlling section (3), based on this continuous shooting speed, a frame thinning setting section (4) sets, for example, from which image and by what thinning rate images buffered by a frame buffer (2) are extracted. Then, in accordance with frame thinning information set by the frame thinning setting section (4), a frame thinning processing section (5) extracts, from among the images stored in the frame buffer (2), images traced back a predetermined amount of time at a predetermined acquisition interval.

13 Claims, 10 Drawing Sheets

FIG. 3

| FRAME THINNING INFORMATION ||
|---|---|
| INFORMATION SIZE : s ||
| INFORMATION HEAD POSITION : t ||
| INFORMATION AMOUNT : j ||
| SWITCHING FRAME NUMBER | ACQUISITION INTERVAL |
| 3000 | 2 |
| 4500 | 10 |
| ⋮ | ⋮ |
| 1 | 10 ← t |
| 1500 | 1 | ature
IMAGING APPARATUS, VARIABLE SPEED IMAGING METHOD, AND RECORDING MEDIUM STORING PROGRAM THEREOF

CROSS-REFERENCE TO RELATED APPLICATION

This application is based upon and claims the benefit of priority from the prior Japanese Patent Application No. 2008-253745, filed Sep. 30, 2008, the entire contents of which is incorporated herein by reference.

BACKGROUND OF THE INVENTION

1. Field of the Invention

The present invention relates to an imaging apparatus, a variable speed imaging method, and a recording medium storing a program thereof.

2. Description of the Related Art

Conventionally, an art for dynamically changing the frame rate when shooting a moving image is known (refer to, for example, Japanese Patent Application Laid-Open (Kokai) Publication No. 2002-320198). In this conventional art, for example, in a case where the frame rate can be dynamically changed between 30 frames per second (fps) and 300 fps, when frames captured from the image sensor element at 300 fps are shot (recorded) at 30 fps, the number of frames is thinned-out to $1/10^{th}$, which are encoded and saved as a file. When the frame rate is changed by user operation to shoot at 300 fps, all frames captured from the image sensor element at 300 fps are encoded and saved as a file. On the other hand, because the frame rate for reproducing a moving image is fixed at 30 fps, portions of the moving image shot at 300 fps are played back in slow motion. High-speed shooting such as this achieves noteworthy effects in the shooting of a decisive moment that is, for example, when a subject such as an athlete or a wild animal moves suddenly.

However, in the shooting of a moving image using the conventional art, when the user changes the frame rate from 30 fps to 300 fps to shoot a decisive moment, the frame rate for the actual recording of the frames is changed from 30 fps to 300 fps at the point in time where the operation instructing the change is performed by the user. In such a technique where the frame rate is changed from 30 fps to 300 fps at a point in time where an operation to shoot a decisive moment is performed by the user, there is a problem that, in a case where the subject moves suddenly and a decisive moment occurs immediately before the user's operation or a case where the reaction of the user's operation is delayed, the decisive moment is filmed at 30 fps and the effects of high-speed shooting is not obtained.

SUMMARY OF THE INVENTION

The present invention has been conceived to solve the above-described problem. An object of the present invention is to provide an imaging apparatus, a variable speed imaging method, and a recording medium storing a program thereof that ensure the high-speed shooting of a decisive moment even in a case where the subject moves suddenly and a decisive moment occurs or a case where the reaction of the user's operation is delayed.

In order to achieve the above-described object, in accordance with one aspect of the present invention, there is provided a imaging apparatus comprising: an imaging means for sequentially imaging a subject at a predetermined frame rate; a holding means for sequentially holding a plurality of frames sequentially imaged by the imaging means; a specifying means for specifying a frame rate at which frames are extracted from the holding means according to a user operation; a frame thinning means for sequentially extracting frames from the holding means at a thinning rate based on a frame rate specified by the specifying means; and a storing means for storing frames sequentially extracted by the frame thinning means as a moving image file; wherein when the specifying means specifies a frame rate change according to a user operation, the frame thinning means applies a thinning rate based on a changed frame rate from a frame traced back in time rather than when the change is specified.

In accordance with another aspect of the present invention, there is provided a variable speed imaging method, comprising: a step for sequentially imaging a subject at a predetermined frame rate; a step for sequentially holding a plurality of frames sequentially imaged; a step for specifying a frame rate at which the frames held are extracted according to a user operation; a step for sequentially extracting the frames held at a thinning rate based on the frame rate specified; a step for storing the frames sequentially extracted as a moving image file; and a step for, when a frame rate change is specified according to a user operation, applying a thinning rate based on a changed frame rate from a frame traced back in time rather than when the change is specified.

In accordance with another aspect of the present invention, there is provided a computer-readable storage medium having stored thereon a program for controlling operation of a moving image imaging apparatus for imaging a moving image that is executable by a computer to perform a process comprising: imaging processing for sequentially imaging a subject at a predetermined frame rate; holding processing for sequentially holding a plurality of frames sequentially imaged by the imaging processing; specifying processing for specifying a frame rate at which frames held by the holding processing are extracted according to a user operation; frame thinning processing for sequentially extracting frames held by the holding processing at a thinning rate based on a frame rate specified by the specifying processing; storing processing for storing frames sequentially extracted by the frame thinning processing as a moving image file; and processing for, when a frame rate change is specified by the specifying processing according to a user operation, applying a thinning rate based on a changed frame rate from a frame traced back in time rather than when the change is specified.

According to the present invention, when a frame rate change is specified corresponding to a user's operation, the thinning rate based on the changed frame rate is applied from frames traced back in time rather than when the change is specified. Therefore, even in a case where the subject moves suddenly and a decisive moment occurs or a case where the reaction of the user's operation is delayed, an advantage is acquired in that high-speed shooting can be reliably performed at the decisive moment.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIG. 3 is a conceptual diagram showing a configuration of frame thinning information in the imaging apparatus according to the embodiment;

DETAILED DESCRIPTION OF THE PREFERRED EMBODIMENTS

The present invention will hereinafter be described in detail with reference to the preferred embodiments shown in the accompanying drawings.

A. Configuration According to an Embodiment

Figure 1:
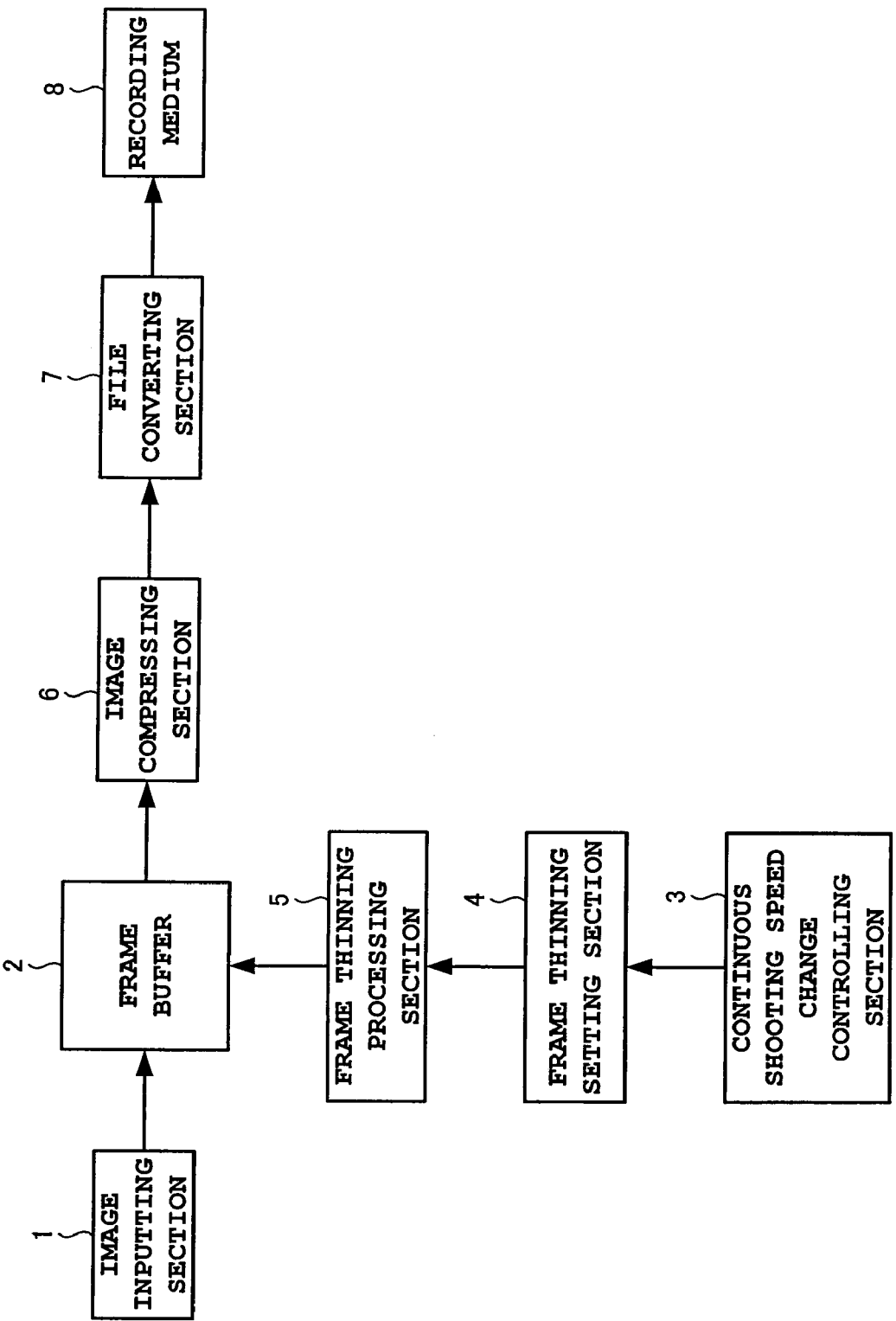
FIG. 1 is a block diagram showing a configuration of an imaging apparatus (digital camera) according to an embodiment of the present invention.

FIG. 1 is a block diagram of a configuration of an imaging apparatus (digital camera) according to an embodiment of the present invention.

In FIG. 1, an image inputting section 1 includes an optical system such as a lens, an image sensor element, etc. The image inputting section 1 captures images at a maximum frame rate (such as 300 fps) and supplies the images to a frame buffer 2. The frame buffer 2 includes a ring buffer and sequentially buffers the images captured by the image inputting section 1.

A continuous shooting speed change controlling section 3 includes a ring-shaped controller provided around the periphery of a lens tube containing the lens. The continuous shooting speed change controlling section 3 generates an instruction to change continuous shooting speed (recording frame rate) to, for example, 30 fps, 150 fps, or 300 fps by rotating the ring-shaped controller. A frame thinning setting section 4 sets frame thinning information when a current continuous shooting speed instructed is detected based on the status of the continuous shooting speed change controlling section 3. The frame thinning information indicates, for example, from which image, and by what acquisition interval (thinning rate), the extraction of the images buffered by the frame buffer 2 is started.

In accordance with frame thinning information set by the frame thinning setting section 4, a frame thinning processing section 5 extracts, from among the images stored in the frame buffer 2, images traced back a predetermined amount of time at a predetermined acquisition interval. The frame thinning processing section 5 then supplies the extracted images to an image compressing section 6. Subsequently, the image compressing section 6 compresses and encodes the images extracted from the frame buffer 2 by the frame thinning processing section 5 using a predetermined codec. Next, the image compressing section 6 supplies the compressed and encoded images to a file converting section 7. Then, after converting the compressed and encoded images into a moving image format file, the file converting section 7 supplies the moving image format file to a recording medium 8. The recording medium 8 includes an internal memory or an external memory, and stores the moving image files thereon.

Figure 2:
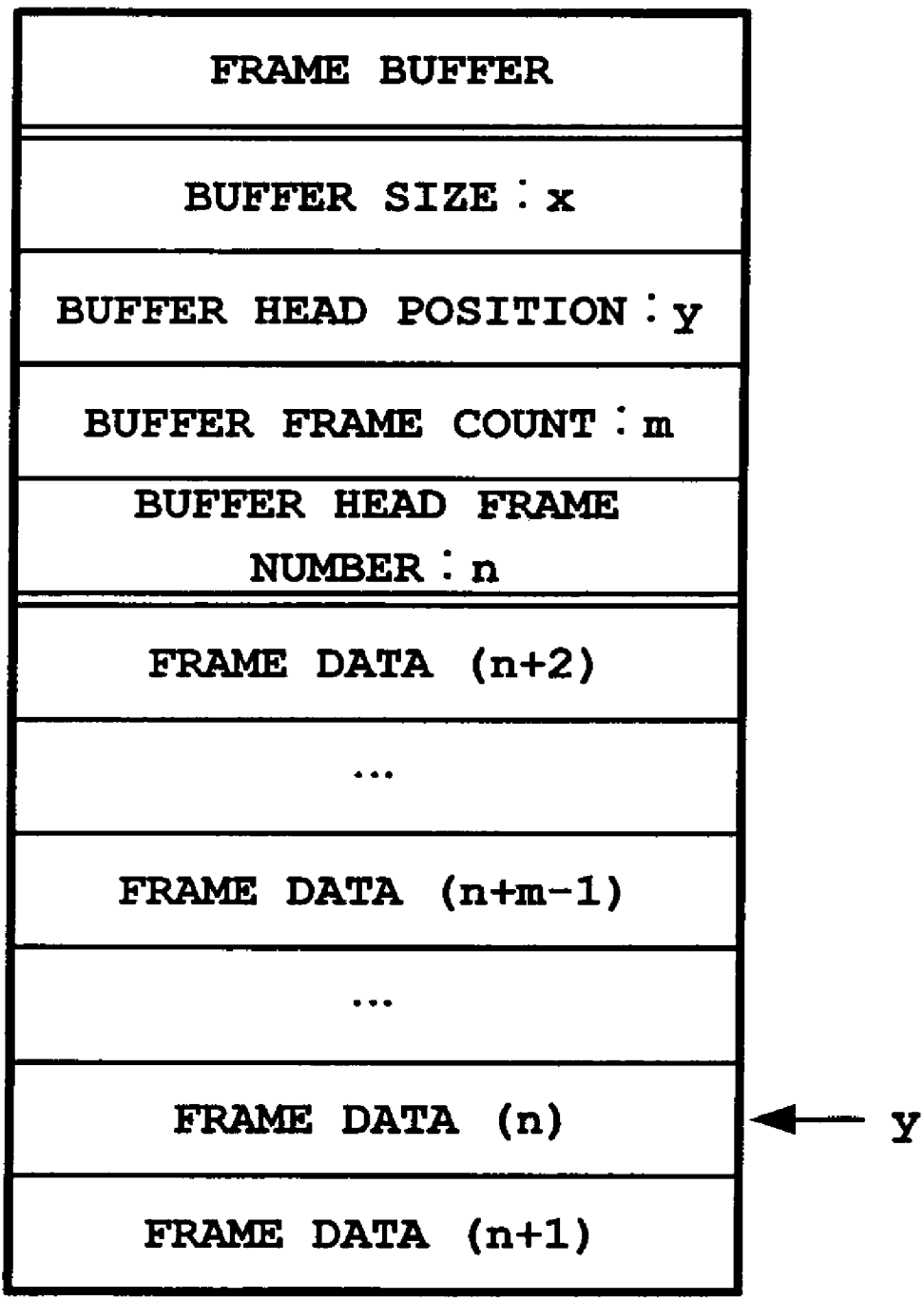
FIG. 2 is a conceptual diagram showing a configuration of a frame buffer in the imaging apparatus according to the embodiment.

Next, FIG. 2 is a conceptual diagram of a configuration of the frame buffer 2 in the imaging apparatus according to the embodiment.

The frame buffer 2 holds a buffer size x, a buffer head position y, a buffer frame count m, and a buffer head frame number n, and sequentially stores images or, in other words, frames captured from the image inputting section 1. Every time a frame is generated in the image inputting section 1, the frame buffer 2 stores a pointer pointing to the frame, namely the buffer head position (currently targeted position) y. The size x of the frame buffer 2 corresponds to the number of frames equivalent to more than the amount of time for changing the frame rates of frames traced back from the point in time at which the continuous shooting speed change control is performed by user operation.

Next, FIG. 3 is a conceptual diagram of a configuration of the frame thinning information in the imaging apparatus according to the embodiment.

The frame thinning information is stored in a ring buffer and includes an information size s, an information head position (currently targeted position) t, and an information amount j. In addition, a switching frame number, and an acquisition interval that is used starting from this switching frame number are sequentially stored as part of the frame thinning information every time continuous shooting speed change control is performed by user operation. The switching frame number indicates from which image the change of the acquisition interval is applied. The acquisition interval indicates an interval at which frames are acquired from the frame buffer 2. For example, when the maximum frame rate is "1" (no thinning) and the frame rate is $1/10^{th}$, the acquisition interval is "10". The information size s is required to be a size greater than the number of times the change control can be performed within the trace back time so that control information recordings are not missed.

In the example in FIG. 3, frame numbers "1" to "1499" are acquired at a frame rate of $1/10^{th}$. Frame numbers "1500" to "2999" are acquired at a frame rate of 1/1 (maximum frame rate). Frame numbers "3000" to "4499" are acquired at a frame rate of ½. Frame number "4500" and subsequent frames are acquired at a frame rate of $1/10^{th}$.

B. Operations According to the Embodiment

Next, operations of the imaging apparatus according to the above-described embodiment will be described.

Figure 4:
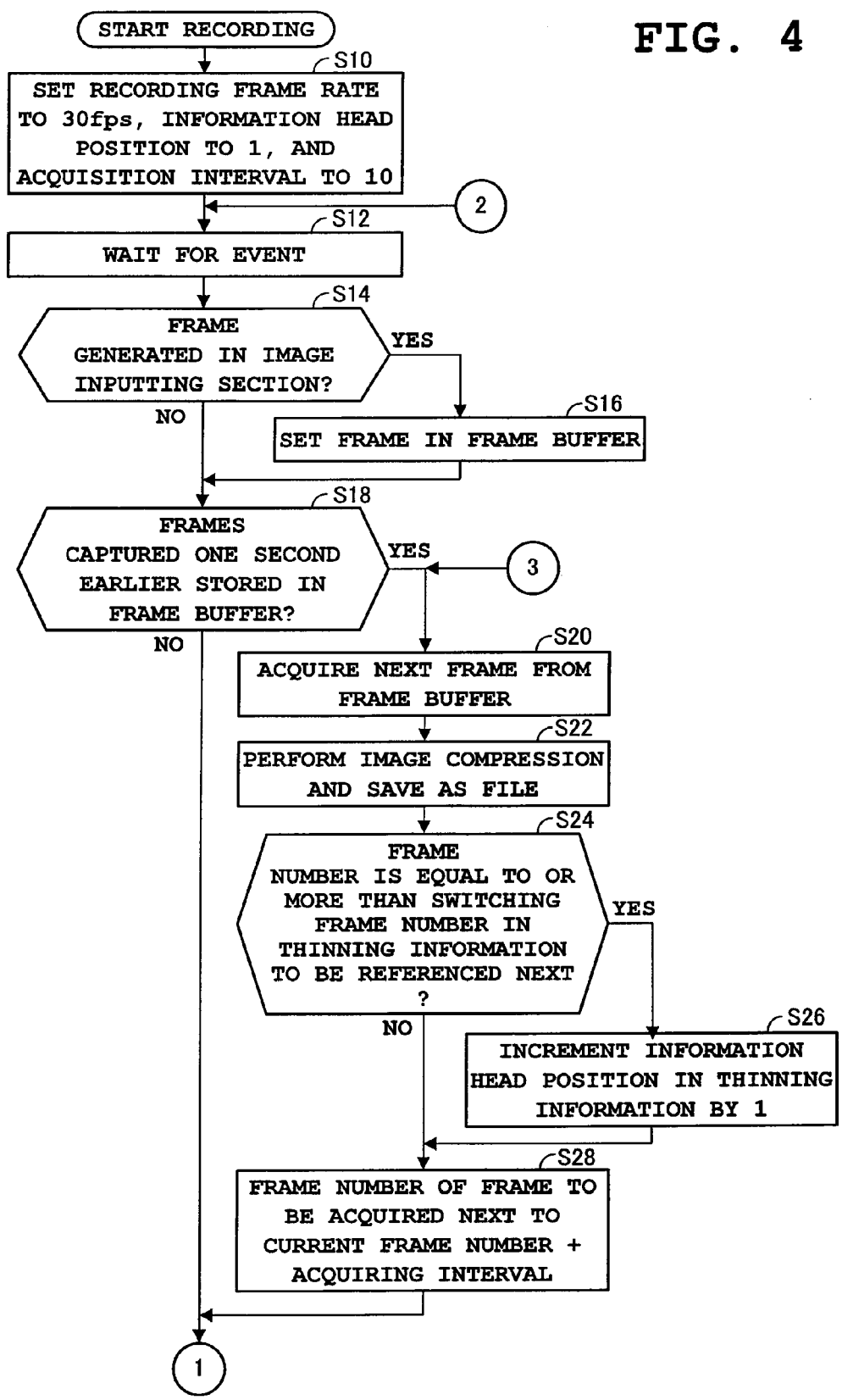
FIG. 4 is a flowchart explaining an operation performed by the imaging apparatus according to the embodiment.
Figure 5:
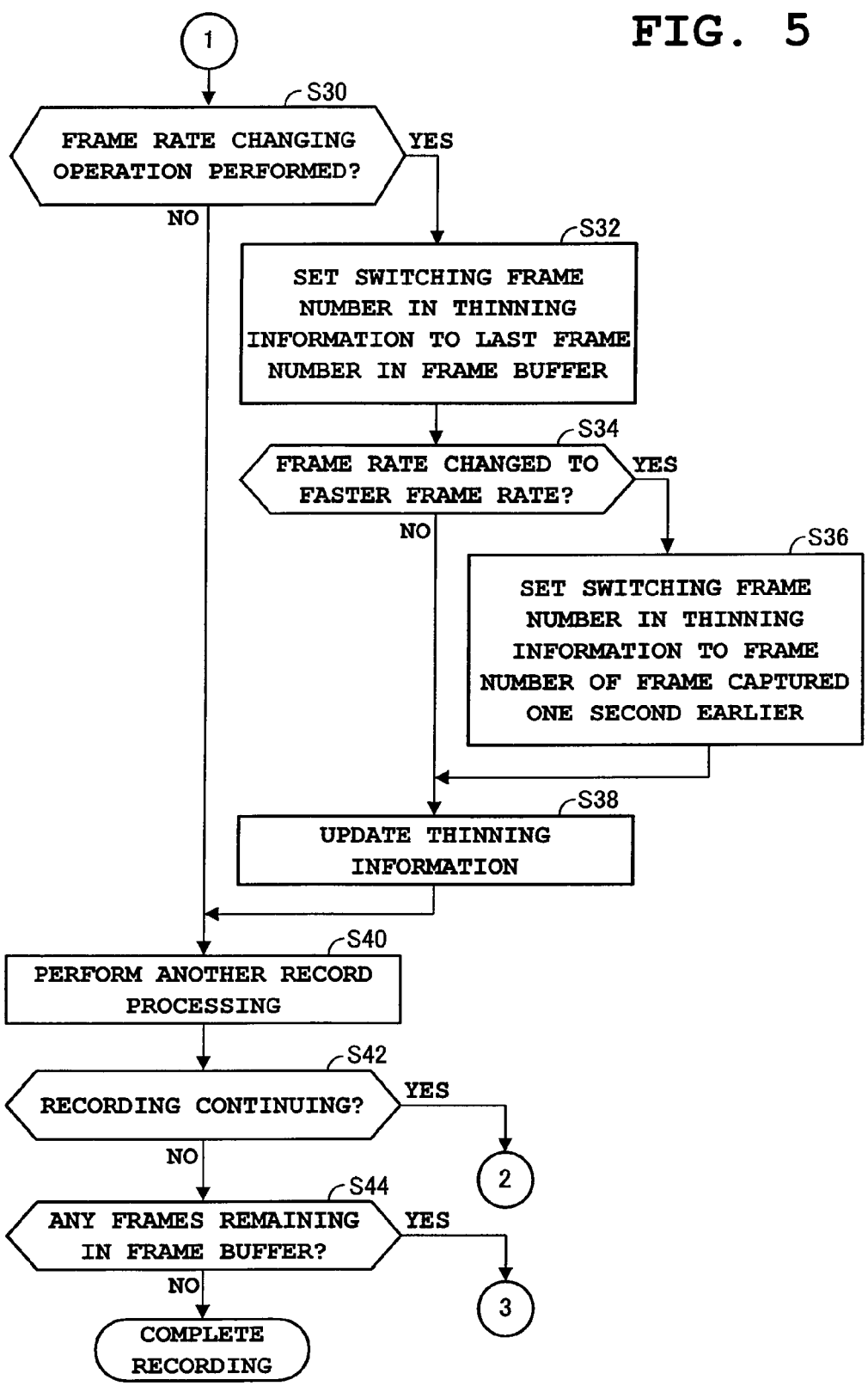
FIG. 5 is a flowchart explaining an operation performed by the imaging apparatus according to the embodiment.

FIG. 4 and FIG. 5 are flowcharts (operation programs) explaining the operations of the imaging apparatus according to the embodiment.

Note that a recording frame rate of this imaging apparatus can be switched to 30 fps, 150 fps, and 300 fps based on the user's operation of the continuous shooting speed change controlling section 3. In addition, images (frames) can be stored in the frame buffer 2 at 300 fps. When frames are being recorded at 30 fps, the frames are thinned-out to $1/10^{th}$ and extracted. When frames are being recorded at 150 fps, the frames are thinned-out to ½ and extracted. The extracted frames are compressed and saved as a file. The frame rate for reproduction is 30 fps, and recording at 30 fps is the actual speed recording. The trace back time for changing the frame rate is one second, based on user operation.

First, as an initial setting, the imaging apparatus sets the recording frame rate to 30 fps, the information head position t in the frame thinning information to "1", and the acquisition interval to "10" ($=1/10^{th}$) (Step S10). Next, the imaging apparatus starts shooting a moving image and waits for an event to occur (Step S12). This event occurs every time images corresponding to a single frame are captured (imaged) from the image inputting section 1. Even while images are not captured from the image inputting section 1, this event occurs at every predetermined amount of time. A reason for this is to allow remaining frames stored in the frame buffer 2 to be processed after an instruction is given to terminate moving image shooting. Then, when the event occurs, the imaging apparatus judges whether or not a frame has been captured from the image inputting section 1 (Step S14). When judged that a frame has been captured, the imaging apparatus stores the frame in the frame buffer 2 (Step S16).

On the other hand, when judged that a frame has not been captured, or after the frame is stored in the frame buffer 2, the imaging apparatus judges whether or not frames captured one second earlier have been stored in the frame buffer 2 (Step S18). In other words, the imaging apparatus judges whether or not frames that should be recorded have been stored in the frame buffer 2. When judged that frames captured one second earlier have not been stored in the frame buffer 2, the imaging apparatus proceeds directly to Step S30 because no frames that should be captured are present.

On the other hand, when judged that frames captured one second earlier have been stored in the frame buffer 2, at Step S20 to Step S28, the imaging apparatus sequentially extracts the frames stored in the frame buffer 2 at the acquisition interval, performs image compression, and saves them as a file. When the frame number of a frame being extracted is equal to or more than the switching frame number in the frame thinning information, an operation for changing the acquisition interval to a value corresponding to the next switching frame number is performed.

First, the imaging apparatus acquires the next frame from the frame buffer 2 (Step S20), and after compressing the acquired frame, saves the compressed frame as a file (Step S22). Then, the imaging apparatus judges whether or not the frame number of the frame is equal to or more than the switching frame number in the frame thinning information to be referenced next (Step S24). When the buffer head position y in the frame buffer 2 is equal to or more than the next switch frame number, the imaging apparatus is required to increment an information reference position (information head position t) of the switching frame number in the frame thinning information by 1.

On the other hand, when the frame number is not equal to or more than the switching frame number in the frame thinning information, the imaging apparatus is not required to increment the information reference position of the switching frame number in the frame thinning information by 1. Therefore, the imaging apparatus performs an update in accordance with the acquisition interval at the same information reference position as up to this point (Step S28). For example, when the current frame number is "1491", the switching frame number in the frame thinning information to be referenced next is "1500", and the current acquisition interval is "10", the frame number to be acquired next is "1501".

On the other hand, when the frame number is equal to or more than the switching frame number in the frame thinning information to be referenced next, the imaging apparatus increments the information head position t by 1 (Step S26) and updates the frame number of the frame to be acquired next in accordance with the acquisition interval at the new information reference position (Step S28). For example, when the current frame number is "1501", the switching frame number in the frame thinning information to be referenced next is "3000", and the current acquisition interval is "1" (see the bottommost row in FIG. 3), the frame number to be acquired next is "1502".

Next, the imaging apparatus judges whether or not a frame rate changing operation has been made by user operation (Step S30). When judged that the frame rate changing operation has been made by user operation, the imaging apparatus updates the frame thinning information at subsequent Step S32 to Step S38.

First, the imaging apparatus sets the switching frame number in the frame thinning information to the last frame number in the frame buffer 2 (the latest frame capturing position) (Step S32). For example, when the last frame number in the frame buffer 2 is "1800", the switching frame number in the new frame thinning information is "1800". Next, the imaging apparatus judges whether or not the frame rate changing operation has changed the frame rate to a faster frame rate (Step S34). When judged that the frame rate changing operation has changed the frame rate to a faster frame rate, for example, when judged that the frame rate has been changed from 30 fps to 300 fps, the imaging apparatus sets the switching frame number in the frame thinning information to "1500" captured one second earlier (=1800-300) (Step S36) sets the acquisition interval to "1", and updates the frame thinning information (Step S38).

When frames correspond to one second are not found in the frame buffer 2 (in other words, when the last frame number is 300 or less), the imaging apparatus sets the head frame number in the frame buffer 2 to the switching frame number in the frame thinning information. When the frame rate is changed from 30 fps to 150 fps or from 150 fps to 300 fps, as in the case where the frame rate is changed from 30 fps to 300 fps, the imaging apparatus sets the switching frame number in the frame thinning information to "1500" captured one second earlier (=1800-300) and sets the acquisition intervals to "2" and "1", respectively.

On the other hand, when judged that the frame rate changing operation has not changed the frame rate to a faster frame rate, for example, when judged that the frame rate has been changed from 300 fps to 150 fps or 30 fps, or from 150 fps to 30 fps, the imaging apparatus sets the switching frame number in the frame thinning information to the last frame number "1800" in the frame buffer 2 as it is, and after setting the acquisition interval to "1" or "10", updates the frame thinning information (Step S38). Here, the imaging apparatus uses the last frame number in the frame buffer 2 as it is to change the frame rate at the point in time where the user operation to change the frame rate is performed so that the decisive moment is not retroactively shot at 30 fps.

Next, after the frame thinning information updating processing accompanying the frame rate changing operation performed by user operation, or when judged that the frame rate changing operation by user operation has not been performed, the imaging apparatus performs another record processing (Step S40) and judges whether or not recording is continuing (Step S42). When recording is continuing, the imaging apparatus returns to Step S12 and repeats the above-described process.

On the other hand, when recording is completed, the imaging apparatus judges whether or not any frames remain in the frame buffer 2 (Step S44). When there are frames in the frame buffer 2, the imaging apparatus returns to Step S20 and repeats the above-described processing. On the other hand, when there are no frames in the frame buffer 2, the imaging apparatus terminates the record processing.

C. Operation Examples

Next, examples of a frame rate switching pattern performed by the imaging apparatus according to the embodiment will be described.

Figure 6:
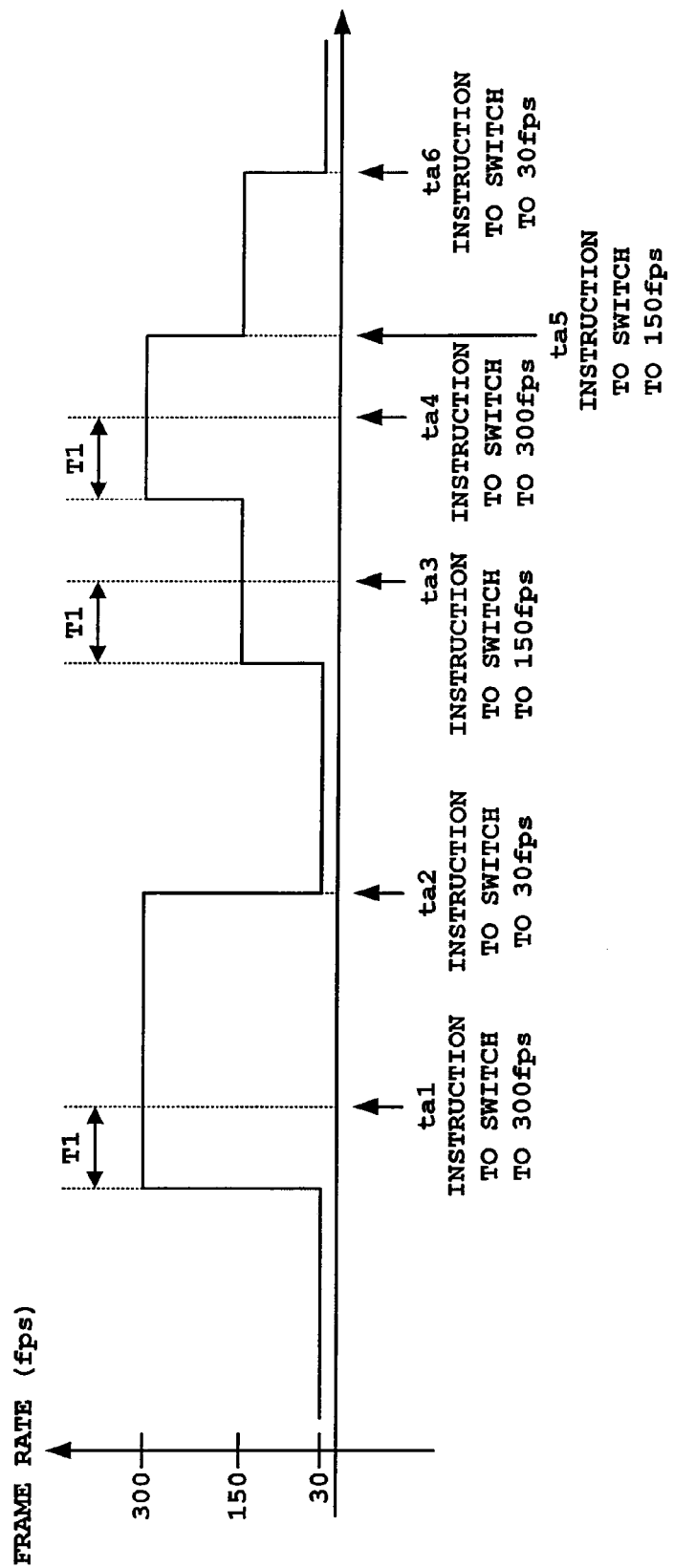
FIG. 6 is a conceptual diagram showing a first frame rate switching pattern according to the embodiment.

FIG. 6 is a conceptual diagram showing a first frame rate switching pattern. In the first switching pattern, when the frame rate is switched from low-speed to high-speed, for example, 30 fps to 150 fps or 300 fps, or 150 fps to 300 fps by user operation, the imaging apparatus traces back an amount of time T1 (such as one second) and changes the recording frame rate. On the other hand, when the frame rate is switched from high-speed to low-speed, for example, 300 fps to 150 fps or 30 fps, or 150 fps to 30 fps, the imaging apparatus changes the recording frame rate in real time without tracing back in time.

As shown in FIG. 6, first, when the frame rate is switched to 300 fps by user operation while shooting at 30 fps at time ta1, the imaging apparatus traces back the amount of time T1 and retroactively switches the recording frame rate to 300 fps. Next, when the frame rate is switched from 300 fps to 30 fps by user operation at time ta2, the imaging apparatus switches the recording frame rate to 30 fps in real time without tracing back in time. Next, when the frame rate is switched from 30 fps to 150 fps by user operation at time ta3, the imaging apparatus traces back the amount of time T1 and retroactively switches the recording frame rate to 150 fps.

When the frame rate is switched from 150 fps to 300 fps by user operation at time ta4, the imaging apparatus again traces back the amount of time T1 and retroactively switches the recording frame rate to 300 fps. Next, when the frame rate is switched from 300 fps to 150 fps by user operation at time ta5, the imaging apparatus switches the recording frame rate to 150 fps in real time without tracing back in time. When the frame rate is switched from 150 fps to 30 fps at time ta6, the imaging apparatus switches the recording frame rate to 30 fps in real time without tracing back in time.

Figure 7:
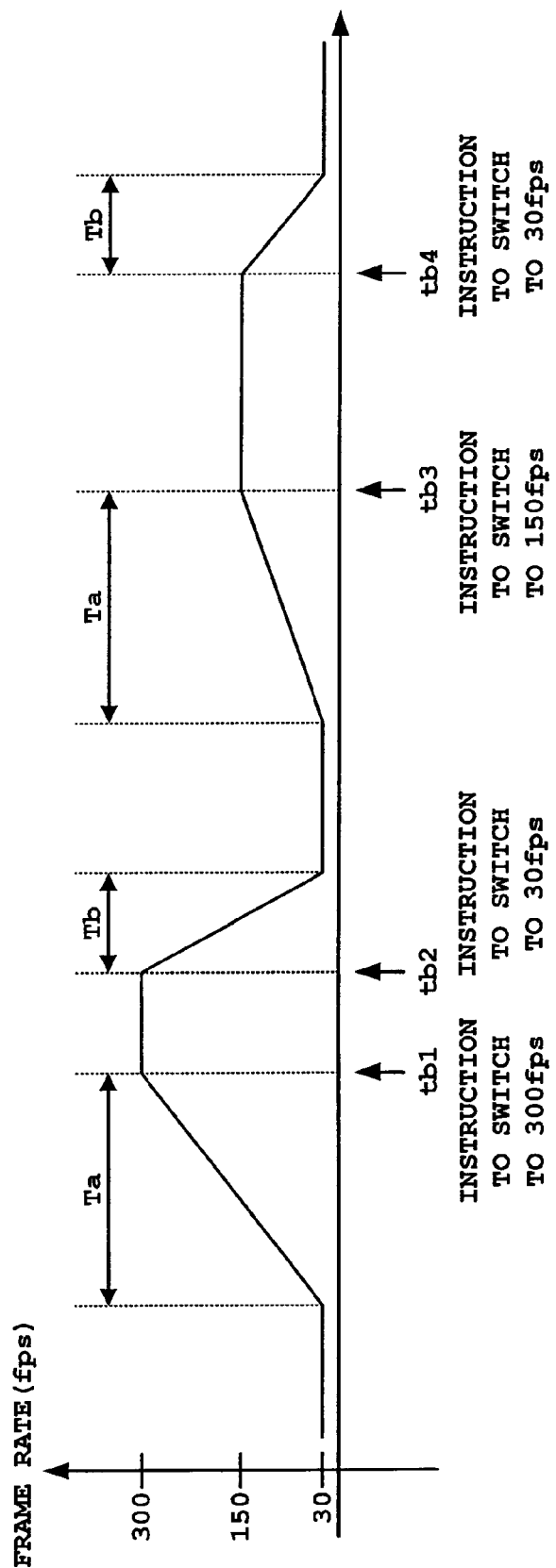
FIG. 7 is a conceptual diagram showing a second frame rate switching pattern according to the embodiment.

FIG. 7 is a conceptual diagram of a second frame rate switching pattern. The second switching pattern is the same as the above-described first switching pattern in that, when the frame rate is switched from low-speed to high-speed by user operation, the imaging apparatus traces back a predetermined amount of time and changes the recording frame rate. However, the second switching pattern differs from the first switching pattern in that, in both of the cases where the frame rate is switched from low-speed to high-speed and where the frame rate is switched from high-speed to low-speed, the imaging apparatus gradually changes a changing speed at which the frame rate is changed and the changing speed is changed based on the amount of change in continuous shooting speed by user operation (changing period is constant).

As shown in FIG. 7, first, when the frame rate is switched from 30 fps to 300 fps by user operation at time tb1, the imaging apparatus traces back a predetermined amount of time Ta and gradually switches the recording frame rate to 300 fps. In a similar manner, when the frame rate is switched from 30 fps to 150 fps by user operation at time tb3, the imaging apparatus traces back the same predetermined amount of time Ta and gradually switches the recording frame rate from 30 fps to 150 fps. That is, in both cases, the changing period is the same.

On the other hand, when the frame rate is switched from 300 fps to 30 fps by user operation at time tb2, the imaging apparatus gradually switches the recording frame rate to 30 fps over a predetermined time Tb. In a similar manner, when the frame rate is switched from 150 fps to 30 fps by user operation at time tb4, the imaging apparatus gradually switches the recording frame rate to 30 fps over the same predetermined time Tb. In both cases, the changing period is the same. In this way, the thinning rate is gradually changed even when the frame rate is switched to the frame rate for real speed recording (30 fps), and as a result, a moving image that gradually changes from slow to real speed is obtained.

Figure 8:
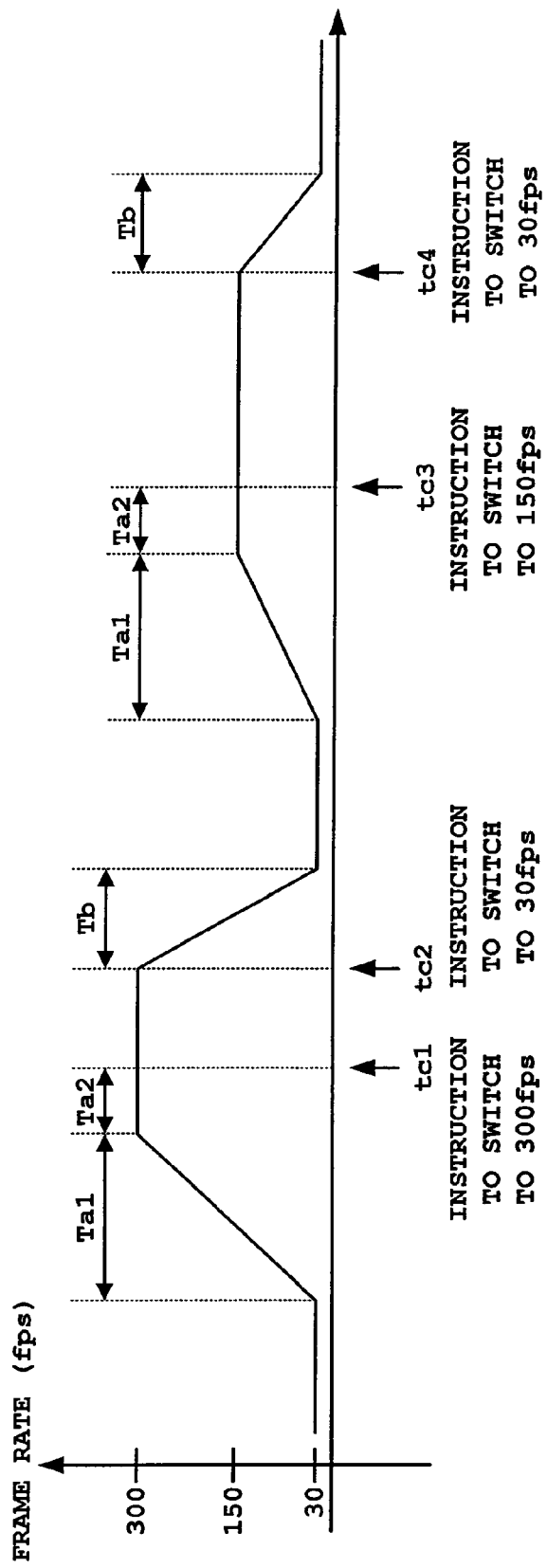
FIG. 8 is a conceptual diagram showing a third frame rate switching pattern according to the embodiment.

Next, FIG. 8 is a conceptual diagram of a third frame rate switching pattern. The third switching pattern is similar to the above-described second switching pattern in that the imaging apparatus traces back a predetermined amount of time and retroactively switches the recording frame rate when the frame rate is switched from low-speed to high-speed by user operation, and that the imaging apparatus gradually changes the changing speed and the changing speed is changed based on the amount of change in the continuous shooting speed by user operation (changing period is constant) in both of the cases where the frame rate is switched from low-speed to high-speed and where the frame rate is switched from high-speed to low-speed. However, the third switching pattern differs from the second switching pattern in that, when an instruction to switch the frame rate from low-speed to high-speed is given by user operation, the imaging apparatus changes the recording frame rate to high-speed at a point traced back a predetermined amount of time from the point in time where the switching instruction is given.

As shown in FIG. 8, first, when the frame rate is switched from 30 fps to 300 fps by user operation at time tc1, the imaging apparatus traces back a predetermined amount of time (Ta1+Ta2). Then, the imaging apparatus gradually switches the recording frame rate to 300 fps during the amount of time Ta1, and fixes the recording frame rate to 300 fps before the amount of time Ta2. In a similar manner, when the frame rate is switched from 30 fps to 150 fps by user operation at time tc3, the imaging apparatus traces back the same predetermined amount of time (Ta1+Ta2). Then, after gradually switching the recording frame rate to 150 fps, the imaging apparatus fixes the recording frame rate to 150 fps before the amount of time Ta2. In both cases, the changing period is the same, and the frame rate is completely switched to high-speed before a predetermined amount of time elapses from the time when the switching instruction is given.

On the other hand, in a manner similar to the above-described second switching pattern, when the frame rate is switched by user operation from 300 fps to 30 fps or from 150 fps to 30 fps, at time tc2 and time tc4, respectively, the imaging apparatus gradually switches the recording frame rate to 30 fps over the same predetermined amount of time Tb.

Figure 9:
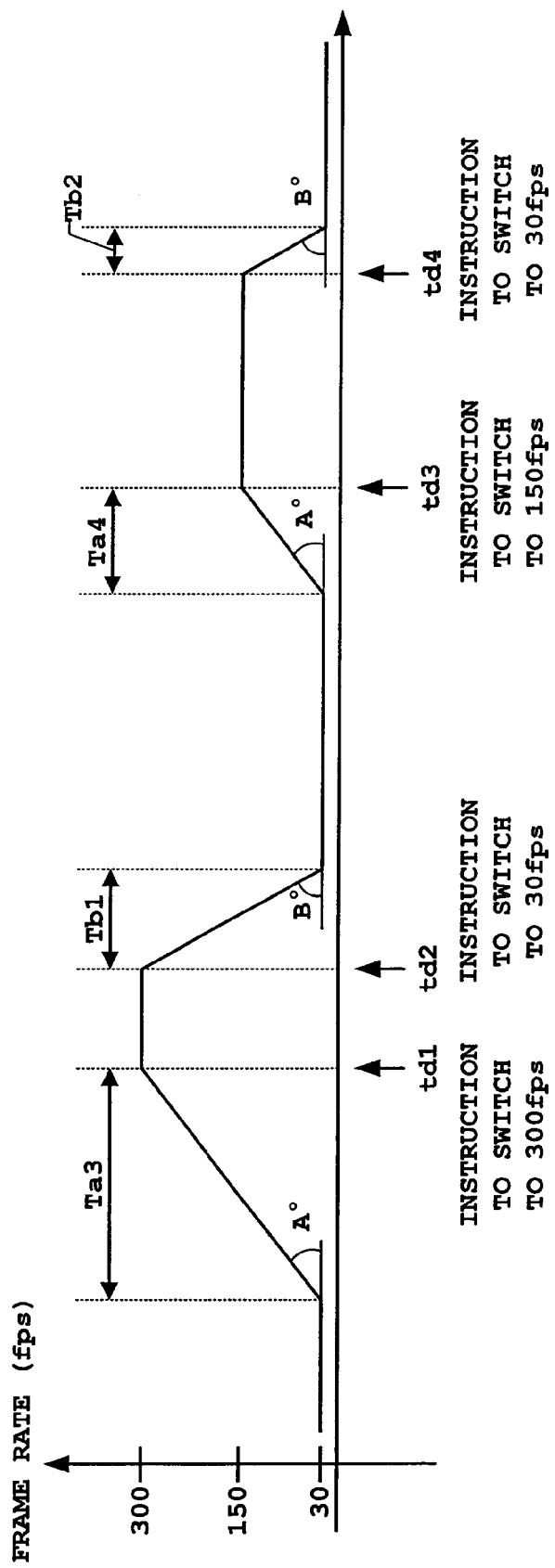
FIG. 9 is a conceptual diagram showing a fourth frame rate switching pattern according to the embodiment.

Next, FIG. 9 is a conceptual diagram of a fourth frame rate switching pattern. The fourth switching pattern is similar to the above-described second switching pattern in that, when the frame rate is switched from low-speed to high-speed by user operation, the imaging device traces back a predetermined amount of time and changes the recording frame rate. These are also similar in that, in both of the cases where the frame rate is switched from low-speed to high-speed and where the frame rate is switched from high-speed to low-speed, the imaging device gradually changes the changing speed. However, the fourth switching pattern differs from the second switching pattern in that the imaging apparatus changes the changing period based on the amount of change in continuous shooting speed by user operation (changing speed is constant).

As shown in FIG. 9, first, when the frame rate is switched from 30 fps to 300 fps by user operation at time td1, the imaging apparatus traces back a predetermined amount of time Ta3 (the amount of time actualizing a changing speed indicated by angle) A°), and gradually switches the recording frame rate to 300 fps. In a similar manner, when the frame rate is switched from 30 fps to 150 fps by user operation at time td3, the imaging apparatus traces back an amount of time Ta4 actualizing the same changing speed, and gradually switches the recording frame rate to 150 fps. In both cases, the changing speed is the same.

On the other hand, when the frame rate is switched from 300 fps to 30 fps by user operation at time td2, the imaging apparatus gradually switches the recording frame rate to 30 fps over a predetermined amount of time Tb1 (the amount of time actualizing a changing speed indicated by angle B°). In a similar manner, when the frame rate is switched from 150 fps to 30 fps by user operation at time td4, the imaging apparatus gradually switches the recording frame rate to 30 fps over an amount of time tb2 actualizing the same changing speed. In both cases, the changing speed is the same.

Figure 10:
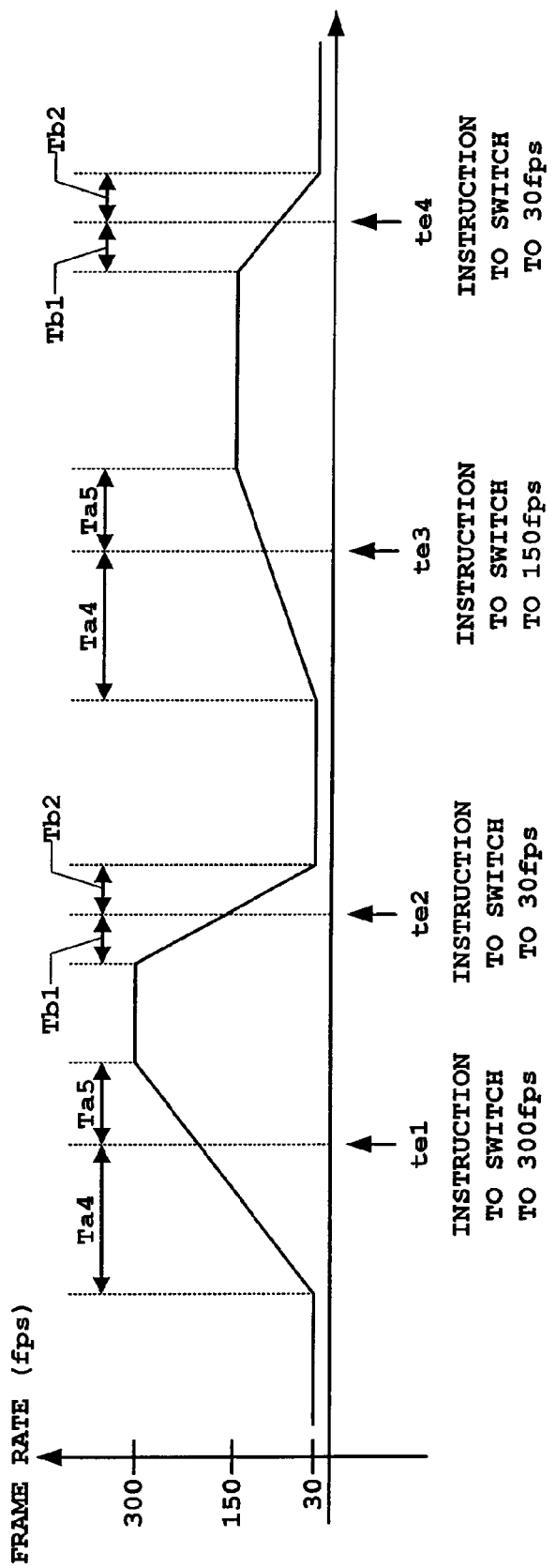
FIG. 10 is a conceptual diagram showing a fifth frame rate switching pattern according to the embodiment.

Next, FIG. 10 is a conceptual diagram of a fifth frame rate switching pattern. In the fifth switching pattern, the changing periods before and after the switching instruction can be arbitrarily set. The user sets in advance the changing periods before and after the instruction to switch the frame rate from low-speed to high-speed, and the changing periods before and after the instruction to switch the frame rate from high-speed to low-speed. The user may set the changing periods by inputting (selecting) the real time or inputting a ratio of the changing periods before and after the instruction.

As shown in FIG. 10, first, when the frame rate is switched from 30 fps to 300 fps by user operation at time te1, the imaging apparatus gradually switches the recording frame rate to 300 fps from a point traced back a set amount of time Ta4 until a set amount of time Ta5. In a similar manner, when the frame rate is switched from 30 fps to 150 fps by user operation at time te3, the imaging apparatus gradually switches the recording frame rate to 150 fps from a point traced back the same set amount of time Ta4 until the set amount of time Ta5.

On the other hand, when the frame rate is switched from 300 fps to 30 fps by user operation at time te2, the imaging apparatus gradually switches the recording frame rate to 30 fps from a point traced back a set amount of time Tb1 until a set amount of time Tb2. In a similar manner, when the frame rate is switched from 150 fps to 30 fps by user operation at time te4, the imaging apparatus gradually switches the recording frame rate to 30 fps from a point traced back the same a set amount of time Tb1 until the set amount of time Tb2.

According to the above-described embodiments, when continuous shooting speed (recording frame rate) is changed from low-speed to high-speed by user operation, the imaging apparatus traces back a predetermined amount of time from the time when the user operation is performed, and changes the recording frame rate to high-speed. Therefore, high-speed shooting is reliably performed at the decisive moment.

Note that, according to the above-described embodiments, the frame buffer is provided at a stage before image compression. However, the frame buffer may be provided at a state after image compression, and the frames may be thinned-out after compression.

In addition, according to the above-described embodiments, the frame rates are 30 fps, 150 fps, and 300 fps. However, the variety of frame rates to which the frame rate is changed may be increased.

Moreover, in the above-described embodiments, the trace back time and the frame rate at the start of recording are not limited to those described therein. Other values may be used.

Furthermore, in the above-described embodiments, when the frame rate is changed to high-speed, the trace back time may be increased corresponding to the changing range of the frame rate.

Still further, in the above-described embodiments, explanation was given on the case of moving images. However, these moving images may be moving images with audio.

While the present invention has been described with reference to the preferred embodiments, it is intended that the invention be not limited by any of the details of the description therein but includes all the embodiments which fall within the scope of the appended claims.

What is claimed is:

1. An imaging apparatus comprising:
   imaging means for sequentially imaging a subject at a predetermined frame rate;
   holding means for sequentially holding a plurality of frames sequentially imaged by the imaging means;
   specifying means for specifying a frame rate at which frames are extracted from the holding means according to a user operation;
   frame thinning means for sequentially extracting frames from the holding means at a thinning rate based on the frame rate specified by the specifying means; and
   storing means for storing frames sequentially extracted by the frame thinning means as a moving image file;
   wherein when the specifying means specifies a frame rate change according to a user operation, the frame thinning means selectively applies a thinning rate based on a changed frame rate from a frame imaged by the imaging means before the frame rate change was specified.

2. The imaging apparatus according to claim 1, wherein the frame thinning means applies the thinning rate based on the changed frame rate from a frame imaged by the imaging means a predetermined amount of time earlier than when the frame rate change was specified, and held by the holding means; and
   wherein the holding means simultaneously holds a plurality of frames including at least frames from the frame imaged the predetermined amount of time earlier by the imaging means to a most recently imaged frame.

3. The imaging apparatus according to claim 2, wherein the frame thinning means performs processing for extracting a frame from the holding means at a timing delayed by the predetermined amount of time or more from a timing at which the frame is imaged by the imaging means.

4. The imaging apparatus according to claim 3, wherein the frame thinning means continues, even after the imaging means completes imaging of a plurality of frames for a moving image, the processing for extracting a frame until all frames held in the holding means are processed.

5. The imaging apparatus according to claim 1, wherein the imaging means continues, regardless of the frame rate change by the specifying means, imaging at a frame rate that is equal to or faster than the fastest frame rate that can be specified by the specifying means.

6. The imaging apparatus according claim 1, wherein when the frame rate is changed by the specifying means according to the user operation, the frame thinning means applies a thinning rate that gradually changes between a frame imaged before the frame rate change was specified to a frame imaged at a time of specifying the frame rate change, wherein the thinning rate changes from a thinning rate based on the frame rate before the change to a thinning rate based on the frame rate after the change.

7. The imaging apparatus according to claim 1, wherein when the frame rate is changed by the specifying means according to the user operation, the frame thinning means applies a thinning rate that gradually changes from a frame imaged before the frame rate change was specified, wherein the thinning rate changes from a thinning rate based on the frame rate before the change to a thinning rate based on the frame rate after the change, and the frame rate thinning means applies the changing thinning rate such that the thinning rate based on the frame rate after the change is achieved at a frame imaged a predetermined amount of time before the frame rate change was specified.

8. The imaging apparatus according to claim 6, wherein the frame thinning means applies the thinning rate that gradually changes from a frame imaged a predetermined amount of time before the frame rate change was specified, wherein the predetermined amount of time is a fixed amount of time regardless of whether the frame rate changed by the specifying means according to the user operation is faster or slower.

9. The imaging apparatus according to claim 6, wherein the frame thinning means sets a changing speed for changing the thinning rate to a fixed speed regardless of whether the frame rate changed by the specifying means according to the user operation is faster or slower.

10. The imaging apparatus according to claim 6, further comprising:
    setting means for setting, when the frame rate is changed by the specifying means according to the user operation, a starting frame and an ending frame to which the thinning rate based on the changed frame rate is applied by the frame thinning means.

11. The imaging apparatus according to claim 1, wherein when a frame rate is changed from a low rate to a high rate by the specifying means according to the user operation, the frame thinning means applies a thinning rate based on a changed frame rate from a frame imaged before the frame rate change was specified, and when a frame rate is changed from a high rate to a low rate by the specifying means according to the user operation, the frame thinning means applies a thinning rate based on a changed frame rate from a frame imaged at a time of specifying the frame rate change.

12. A variable speed imaging method, comprising:
    sequentially imaging a subject at a predetermined frame rate;
    sequentially holding a plurality of sequentially imaged frames;
    specifying a frame rate at which the held frames are extracted according to a user operation;
    sequentially extracting the held frames at a thinning rate based on the specified frame rate; and
    storing the frames sequentially extracted as a moving image file;
    wherein when a frame rate change is specified according to a user operation, a thinning rate based on a changed frame rate is selectively applied from a frame imaged before the frame rate change was specified.

13. A non-transitory computer-readable storage medium having stored thereon a program for controlling operation of a moving image imaging apparatus for imaging a moving image, the program being executable by a computer to perform a process comprising:
    sequentially imaging a subject at a predetermined frame rate;
    sequentially holding a plurality of sequentially imaged frames;
    specifying a frame rate at which held frames are extracted according to a user operation;
    sequentially extracting held frames at a thinning rate based on the specified frame rate; and
    storing sequentially extracted frames as a moving image file;
    wherein when a frame rate change is specified according to a user operation, a thinning rate based on a changed frame rate is selectively applied from a frame imaged before the frame rate change was specified.

* * * * *